United States Patent

Hirokane et al.

Patent Number: 5,402,408
Date of Patent: Mar. 28, 1995

[54] MAGNETO-OPTICAL RECORDING METHOD OF OVERWRITING WITHOUT REQUIRING AN INITIALIZATION MAGNET

[75] Inventors: Junji Hirokane; Hiroyuki Katayama; Junichiro Nakayama; Michinobu Mieda; Kenji Ohta, all of Nara, Japan

[73] Assignee: Sharp Kabushiki Kaisha, Osaka, Japan

[21] Appl. No.: 964,428

[22] Filed: Oct. 21, 1992

[30] Foreign Application Priority Data

Oct. 21, 1991 [JP] Japan ................................. 3-272414
Oct. 24, 1991 [JP] Japan ................................. 3-277753

[51] Int. Cl.⁶ ......................... G11B 11/10; G11B 7/24
[52] U.S. Cl. ..................... 369/116; 369/13; 369/275.2; 360/59
[58] Field of Search ............ 369/13, 116, 110, 275.2; 360/59, 57, 114

[56] References Cited

U.S. PATENT DOCUMENTS

| | | | |
|---|---|---|---|
| 5,020,040 | 5/1991 | Lee | 369/13 |
| 5,062,091 | 10/1991 | Maeda et al. | 369/13 |
| 5,087,532 | 2/1992 | Challener, IV | 369/13 |
| 5,091,896 | 2/1992 | Takayama | 369/13 |
| 5,142,513 | 8/1992 | Takehara et al. | 369/13 |
| 5,175,714 | 12/1992 | Kikitsu et al. | 369/13 |
| 5,184,335 | 2/1993 | Kryder et al. | 369/13 |
| 5,325,344 | 6/1994 | Ohta et al. | 369/13 |
| 5,337,293 | 8/1994 | Tokita | 369/13 |

FOREIGN PATENT DOCUMENTS

| | | |
|---|---|---|
| 0217096 | 4/1987 | European Pat. Off. . |
| 0336237 | 10/1989 | European Pat. Off. . |
| 0361970 | 4/1990 | European Pat. Off. . |
| 0422783 | 4/1991 | European Pat. Off. . |
| 0440486 | 8/1991 | European Pat. Off. . |

Primary Examiner—Paul M. Dzierzynski
Assistant Examiner—Kim-Kwok Chu
Attorney, Agent, or Firm—David G. Conlin; Robert F. O'Connell

[57] ABSTRACT

A magneto-optical recording method for rewriting of information including the steps of projecting a light beam, whose intensity varies in response to information to be recorded, onto a magnetic thin film with perpendicular magnetization while an external magnetic field of a constant intensity is being applied thereto; and arranging the magnetization direction of an area irradiated with the light beam of the magnetic thin film with perpendicular magnetization in the direction of the external magnetic field when projecting the light beam of high intensity, while arranging it in the direction of demagnetizing field, opposite to the direction of the external magnetic field generated by magnetization in the vicinity of the irradiated area when projecting the light beam of low intensity, and a magneto-optical memory element provided with a base whereon the magnetic thin film with perpendicular magnetization and an in-plane magnetization film are formed. With the above arrangement, an overwriting operation can be carried out through light intensity modulation without requiring an initialization magnet.

5 Claims, 8 Drawing Sheets

MAGNETO-OPTICAL RECORDING METHOD OF OVERWRITING WITHOUT REQUIRING AN INITIALIZATION MAGNET

FIELD OF THE INVENTION

The present invention relates to a magneto-optical recording method for carrying out an overwriting operation through the light intensity modulation on a magneto-optical memory device such as a magneto-optical disk, and to a magneto-optical memory device suitable for the above magneto-optical recording method.

BACKGROUND OF THE INVENTION

Recently, magneto-optical memory devices such as magneto-optical disks, have been viewed with interest as rewritable high density and large capacity memory devices. Especially, a demand for a magneto-optical memory device, whereon a so-called overwriting operation can be carried out without erasing the previously written information, is increasing.

For the overwriting method, the magnetic field modulation and the light intensity modulation which utilizes an exchange coupled film have been proposed.

An overwriting operation through the magnetic field modulation is carried out in the following way. While projecting a light beam of a constant intensity on a predetermined recording area of the magneto-optical memory device, a magnetic field, whose direction reverses in response to information to be recorded, is applied from a magnetic head, thereby recording information. For the magnetic head, a floating-type magnetic head provided with a slider, which is adopted in, a hard disk device, etc., is used in order to generate a strong magnetic field of high frequency.

As described in the summary of the Spring Meeting by the Applied Physics Society in 1987, page 721 (lecture number 28p-ZL-3), for the overwriting operation through the light intensity modulation, a magneto-optical memory device, having an exchange coupled film of a double layer structure consisting of a memory layer and a writing layer made of a magnetic substance laminated on a base, is employed. When carrying out the overwriting operation, first the magnetization direction of the writing layer is arranged in one direction by an initialization magnet. Then, while applying a magnetic field, whose direction is opposite to the arranged direction, to a predetermined recording area of the memory layer from a subsidiary magnet, a light beam, whose intensity varies in response to information to be recorded, is projected on the recording area, thereby recording information.

In the summary of the 13th lecture by the Japan Applied Magnetic Society in 1989, page 192 (lecture number 23aC-4), a magneto-optical memory device having an exchange coupled film of a four layer structure consisting of an initialization layer, a control layer, a subsidiary recording layer and an information recording layer laminated on a glass base was employed. Here, the magnetization direction of the initialization layer is arranged in one direction beforehand and is not reversed throughout the operation. When carrying out an overwriting operation, while applying a magnetic field, whose direction is opposite to the arranged direction, to the predetermined recording area of the information recording layer from the subsidiary magnet, a light beam, whose intensity varies in response to the information to be recorded, is projected on the recording area, thereby recording information.

However, the above overwriting operation through the magnetic field modulation creates the following problems. When a magnetic head starts floating, a slider, whereon the magnetic head is provided, slides on the magneto-optical memory device. Therefore, scratches may occur on the magneto-optical memory device, or the magnetic head may be crushed. This means that recording and reproducing of information cannot be carried out without sacrificing the non-contact operation which is the essential characteristic of the magneto-optical memory device.

Whereas, in the case of the overwriting operation through the light intensity modulation using the magneto-optical memory device mainly consisting of the exchange coupled film of a double layer structure, the following problem arises. That is, a large initialization magnet which generates a magnetic field of several kOe is required.

On the other hand, when the magneto-optical memory device mainly consisting of the exchange coupled film of a four layer structure is employed for the overwriting operation through the light intensity modulation, if the initialization layer is initialized beforehand, an additional initialization is not required. However, there is a difficulty in manufacturing the magneto-optical memory device since each layer needs to be set for a predetermined coercive force and Curie temperature.

SUMMARY OF THE INVENTION

An object of the present invention is to provide a magneto-optical recording method by which an overwriting operation can be carried out on a magneto-optical recording device without requiring an initialization magnet.

In order to achieve the above object, the magneto-optical recording method for rewriting of information in accordance with the present invention is characterized by the following steps. A light beam is projected, whose intensity varies response to information to be recorded, onto the magnetic thin film with perpendicular magnetization while an external magnetic field of a constant intensity is being applied thereto. Then, the magnetization direction of an area irradiated with the light beam of the magnetic thin film with perpendicular magnetization is arranged in the direction of the external magnetic field when projecting the light beam of a high intensity, while when projecting the light beam of a low intensity, it is arranged in the direction of a demagnetizing field, opposite to the direction of the external magnetic field generated by magnetization in the vicinity of the irradiated area.

With the above arrangement, an overwriting operation can be carried out through the light intensity modulation without requiring the magneto-optical recording method.

Another object of the present invention is to provide a magneto-optical memory device suitable for the magneto-optical recording method through the light intensity modulation.

In order to achieve the above object, the magneto-optical memory device in accordance with the present invention is provided with a base whereon a magnetic thin film with perpendicular magnetization and an in-plane magnetization film are formed.

According to the above arrangement, the overwriting operation can be carried out through the light intensity modulation without requiring an initialization magnet. Moreover, since the in-plane magnetization film serves as a magnetic path for the demagnetizing field, the demagnetizing field of the area irradiated with the light beam increases. As a result, an accurate recording operation can be performed.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 7 show a first embodiment of the present invention.

FIG. 1 is an explanatory view showing a magneto-optical recording method of the present invention. (a) shows changes in the intensity of the light beam as time passes. (b) shows a magnetization of the magnetic thin film with perpendicular magnetization.

FIG. 2 is an explanatory view, showing aspects of a magneto-optical recording method of the present invention wherein:

FIGS. 8 through 10 show a second embodiment of the present invention.

FIGS. 11 through 13 show a third embodiment of the present invention.

FIGS. 14 and 15 show a fourth embodiment of the present invention.

FIGS. 16 and 17 show a fifth embodiment of the present invention.

DESCRIPTION OF THE EMBODIMENTS

The following description will discuss one embodiment of the present invention with reference to FIGS. 1 through 7.

Figure 3:
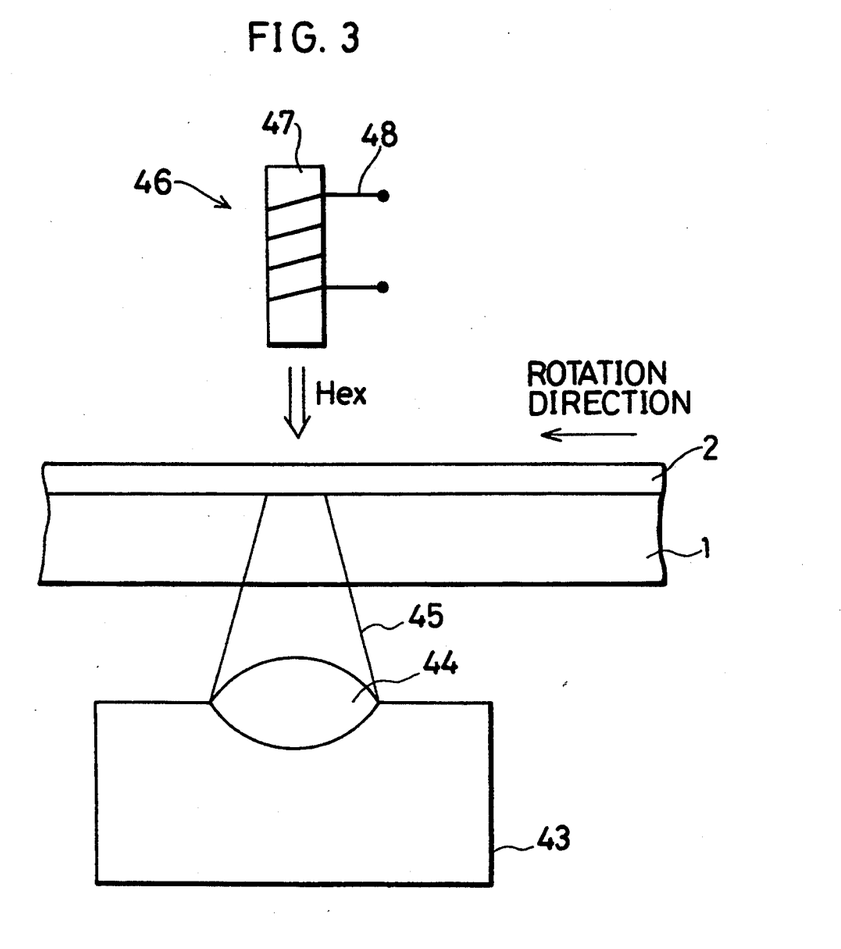
FIG. 3 is a schematic view showing the configuration of the magneto-optical disk device.

A magneto-optical disk of the present embodiment as an example of the magneto-optical memory devices have a base 1 and a magneto-optical recording medium layer 2 formed thereon as shown in FIG. 3. The base 1, through which light can be transmitted, is disc-shaped. On the side of the magneto-optical recording medium layer 2 formed on the base 1, grooves (not shown) for guiding a light beam 45 are normally formed around an axis or formed in a spiral shape.

The magneto-optical recording medium layer 2, for example, has a three layer structure consisting of a first dielectric film, a magnetic thin film with perpendicular magnetization made of a magnetic substance and a second dielectric film laminated in this order on the base 1. The first and the second dielectric films are provided for protecting the magnetic thin film with perpendicular magnetization. The first dielectric film also emphasizes the magnetic Kerr effect. In addition, the magneto-optical recording medium layer 2 may have a four layer structure wherein a reflecting film is further provided on the second dielectric film.

The magneto-optical disk having the magneto-optical recording medium layer 2 of a three layer structure is produced, for example, as follows. An AlN film with a thickness of 80 nm (first dielectric film), a $Dy_{20}Fe_{56}Co_{24}$ film with a thickness of 100 nm (magnetic thin film with perpendicular magnetization), and an AlN film with a thickness of 80 nm (second dielectric film) are laminated in this order on the base 1 made of polycarbonate. The magnetic thin film with perpendicular magnetization has coercive force of 5 kOe at room temperature, and its Curie temperature is 200° C.

Similarly, the magneto-optical disk having the magneto-optical recording layer 2 of a four layer structure may be produced as follows.

An AlN film with a thickness of 80 nm (first dielectric film), a $Dy_{20}Fe_{56}Co_{24}$ film with a thickness of 20 nm (magnetic thin film with perpendicular magnetization), an AlN film with a thickness of 25 nm (second dielectric film), and an Al film with a thickness of 50 nm (reflecting film) are laminated in this order on the base 1 made of polycarbonate.

The magneto-optical disk drive (magneto-optical recording and reproducing apparatus) essentially consists of an optical head 43 and an electro-magnet 46. The optical head 43 is located on the side of the base 1 of the magneto-optical disk. The electro-magnet 46 is located on the side of the magneto-optical recording medium layer 2 of the magneto-optical disk so as to face the optical head 43.

The optical head 43 includes a light source (such as a semiconducting laser) and an objective 44. The objective 44 is provided for converging light emitted from the light source and for projecting a light beam 45 on the magneto-optical recording medium layer 2.

The electro-magnet 46 consists of a cylindrical magnetic core 47 and a coil 48 wound around the magnetic core 47. The electro-magnet 46 applies a constant external magnetic field Hex to the area irradiated with the light beam 45 of the magneto-optical recording medium layer 2 in a direction perpendicular to the magneto-optical recording medium layer 2 while the light beam 45 is being projected thereto.

With the above arrangement, an overwriting operation, i.e., rewriting of information, is performed in the following way. The constant external magnetic field Hex is applied from the electro-magnet 46 to the magneto-optical disk which is rotating in a predetermined direction. Here, the external magnetic field Hex is applied in a direction perpendicular to the magneto-optical recording medium layer 2 (downward). In the meantime, the light beam 45 is projected on the magneto-optical disk. The intensity of the light beam 45 varies in response to the information to be recorded.

Figures 1A, 1B:
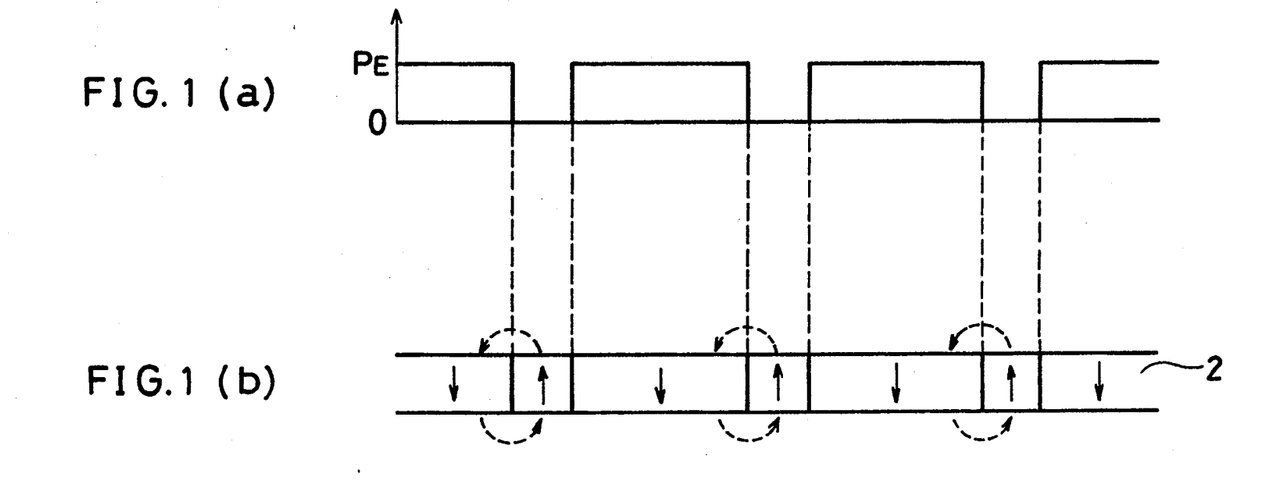

The following will explain the overwriting operation when the intensity of the light beam 45 varies as shown in FIG. 1(a). In the figure, the vertical axis indicates the intensity of light, and the horizontal axis indicates time.

FIG. 1(b) shows the magnetization of the magnetic thin film with perpendicular magnetization when the intensity of the light beam 45 varies as shown in FIG. 1(a). The magnetization direction is indicated by an upward or downward arrow. In the figure, the position on the magneto-optical recording medium layer 2 in a track direction corresponds to the intensity of the light beam 45 projected on the position.

When projecting the light beam 45 of erasing power level $P_E$ (high level), the magnetization direction of the magnetic thin film with perpendicular magnetization is in the direction of the external magnetic field Hex (downward in the figure). On the other hand, when the light beam 45 is not projected (low level), the magnetization direction is in the direction of demagnetizing field (shown by the dotted line) which is generated by the described downward magnetization (upward direction in the figure).

The following will describe the overwriting operation in more detail with reference to FIGS. 2(a) through 2(f).

Figures 2A, 2B:
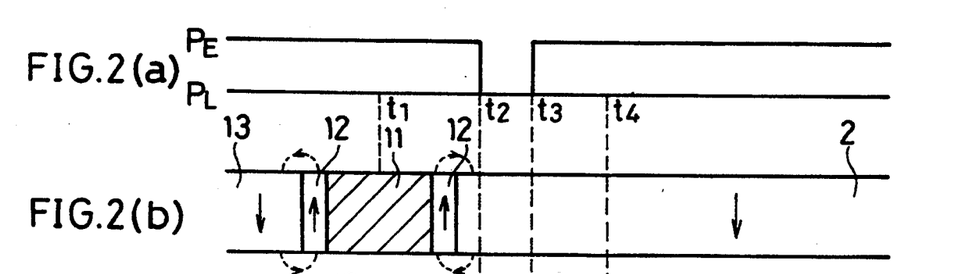
FIG. 2(a) shows a variation in a light beam used for recording.
FIG. 2(b) shows the magnetization of the magnetic thin film when the intensity of the beam is at the erasing power level at $t_1$.

An example is given through the case where the intensity of the light beam 45 varies as shown in FIG. 2(a). In this example, the intensity of the light beam 45 is first set at the erasing power level $P_E$ (high level), and set at the recording power level $P_L$ (low level) at $t_2$. Then, at $t_3$, it is set back to the erasing power level $P_E$. In addition, the erasing power level $P_E$ is a laser power level which is sufficient to raise the temperature of the magnetic thin film with perpendicular magnetization above its Curie temperature. On the other hand, the recording power level $P_L$ is a laser power level which is not sufficient to raise the temperature of the magnetic thin film with perpendicular magnetization above its Curie temperature (normally zero).

FIGS. 2(b) through (f) show the magnetization of the magnetic thin film with perpendicular magnetization of the magneto-optical recording medium layer 2 when the intensity of the light beam 45 varies as described above. In the figures, the magnetization direction is indicated by an upward or downward arrow, and the position on the magneto-optical recording medium layer 2 in the track direction corresponds to the intensity of the light beam 45 projected on the position.

At $t_1$, the intensity of the light beam 45 is at the erasing power level $P_E$. Therefore, an area 11 of the magnetic thin film with perpendicular magnetization, whereon the light beam 45 is projected, is raised above its Curie temperature (the shaded area indicates that the temperature is above the Curie temperature). Thus, the magnetization in the area 11 disappeared. Since the temperature of the area 12 on both sides of the area 11 is high but below the Curie temperature, the area 12 exhibits magnetization, but the magnetization is small. The magnetization direction of the area 12 is in the direction of the demagnetizing field (indicated by the dotted line) generated by the magnetization of an area 13 farther from the area 11 than the area 12. The magnetization of the area 13 is in the direction of the external magnetic field Hex (downward in the figure). The demagnetizing magnetic field (the direction of the external magnetic field Hex, i.e., downward in the figure) is generated by the magnetization of an area 13 located farther from the area 11 than the area 12.

Figure 2C:
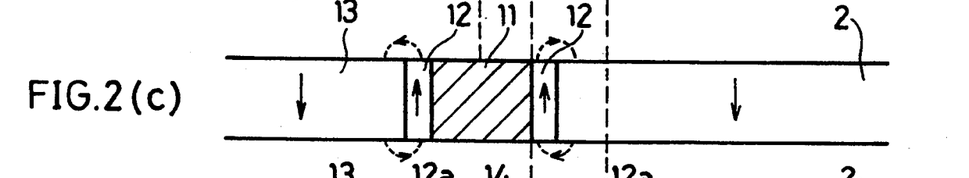
FIG. 2(c) shows the magnetization of the magnetic thin film where the intensity of the beam is at the erasing beam level at $t_2$.

Until $t_2$, the intensity of the light beam 45 is set at the erasing power level $P_E$. Therefore, the area 11 having a temperature rise above its Curie temperature is shifted to the right with the rotation of the magneto-optical disk as shown in FIG. 2(c). Further, with the shift of the area 11, the area 13, which exhibits downward magnetization, is also shifted to the right. This is because when the intensity of the light beam 45 is at the erasing power level $P_E$, the magnetization direction is arranged in the direction of the external magnetic field Hex.

Figure 2D:
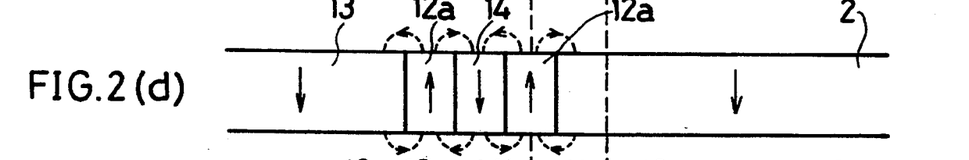
FIG. 2(d) shows the magnetization of the magnetic thin film when the intensity of the beam is lowered to the recording power level at $t_2$.

When the intensity of the light beam 45 is lowered to the recording power level $P_L$ at $t_2$, the respective temperatures of the areas 11 and 12 suddenly drop. As a result, the magnetization of the area 12 becomes larger, and the interaction between the demagnetizing field generated by the magnetization of the area 13 becomes strong. With the expansion of the area 12 having the upward magnetization, the area 12a is formed as shown in FIG. 2(d). Further, an area 14, exhibiting downward magnetization, is formed by the demagnetizing field generated by the upward magnetization of the area 12a.

Figure 2E:
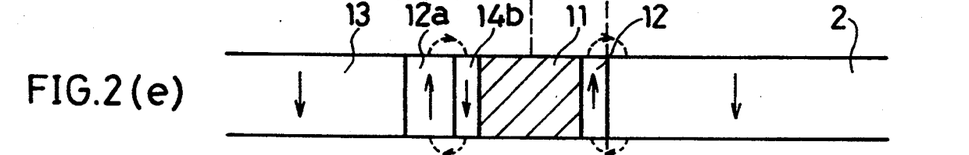
FIG. 2(e) shows the magnetization of the magnetic thin film when the intensity of the beam is raised to the erasing power level at $t_3$.

When the intensity of the light beam 45 is raised back to the erasing power level $P_E$ at $t_3$, the temperature of the area 11, whereon the light beam 45 is projected, is raised above its Curie temperature, and the magnetization of the area 11 disappears as shown in FIG. 2(e). Therefore, the area 14 becomes smaller to be a new area 14b.

Figure 2F:
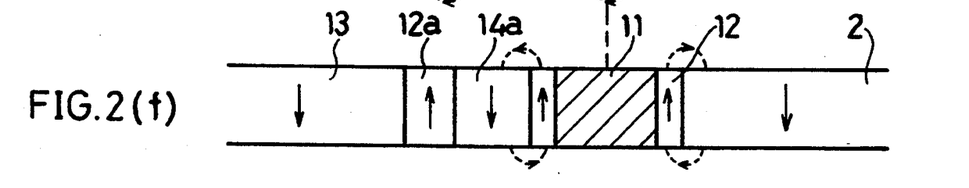
FIG. 2(f) shows the magnetization of the magnetic thin film when the intensity of the beam is at the erasing power level at $t_4$. (f) show magnetization of the magnetic thin film with perpendicular magnetization as time passes.

At $t_4$, the area 11 having a temperature rise above the Curie temperature is shifted to the right as shown in FIG. 2(f). With the shift of the area 11, the area 14b having downward magnetization is expanded to the right. This is because, the magnetization direction is arranged in the direction of the external magnetic field Hex when the intensity of the light beam 45 is at the erasing power level $P_E$ as previously mentioned.

As described, with the projection of the light beam 45 at the recording power level $P_L$, the area 12a having the upward magnetization opposite to the direction of the external magnetic field Hex can be formed on the magnetic thin film with perpendicular magnetization on the magneto-optical recording medium layer 2.

Using the two kinds of magneto-optical disks described in the above embodiment, an actual test for the overwriting operation is conducted. For test conditions, the rotation speed of the magneto-optical disk, the erasing power level $P_E$, recording power level $P_L$, the external magnetic filed are respectively set at 900 rpm, 7 mW, 0 mW and 150 Oe. Here, the recording area is set at 30 mm radial position of the magneto-optical disk.

Under the above conditions, the light beam 45 of the erasing power level $P_E$ is projected on the magneto-optical disk with a cycle of 1000 ns for 200 ns. As a result, the recording bit with a length of 0.5 μm is formed on the magneto-optical disk at approximately every 2.8 μm.

Thereafter, with the projection of the light beam 45 of the erasing power level $P_E$, the previous recording bit is erased, and the recording bit with a length of 0.5 μm is formed on the magneto-optical disk at approximately every 4.2 μm.

Figure 4:
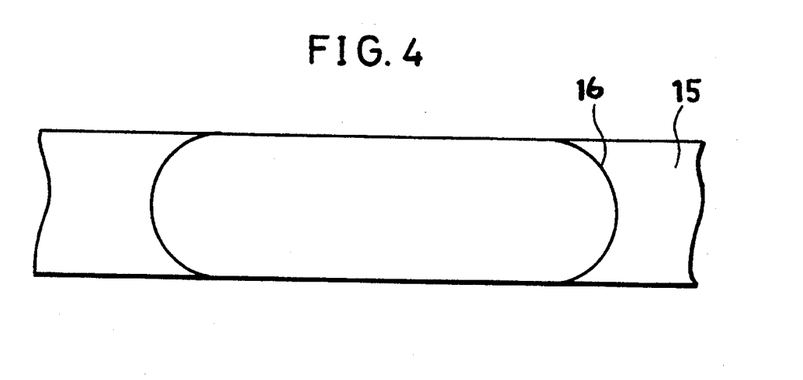
FIG. 4 is an explanatory view showing how the light spot with an elliptical cross-section of the light beam relates to the recording track.
Figure 5:
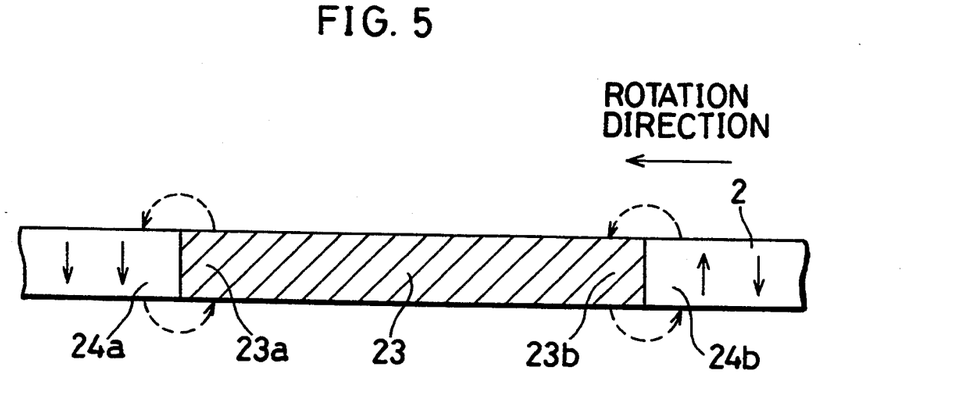
FIG. 5 is an explanatory view showing the demagnetizing field to be applied to the area irradiated with the light beam of FIG. 4.

As shown in FIG. 4, the light beam 45 is set so as to form a light spot 16 of an elliptical shape on a recording track 15 of the magneto-optical disk, whose major axis is parallel to the recording track 15. With this arrangement, as shown in FIG. 5, the magnetization of the area 23a is greatly interacted with the demagnetizing field (indicated by a shaded area), i.e., opposite to the direction of the external magnetic field Hex, the external magnetic field Hex being generated from the area 24a adjacent to the area 23a. The area 23a is located in the rotation direction side of the area 23, whereon a light beam 45 is projected, of the magnetic thin film with perpendicular magnetization as a part of the magneto-optical recording medium layer 2. On the other hand, the area 24b adjacent to the area 23b at the side opposite to the side of the rotating direction is located far from the area 23a. Therefore, the magnetization of the area 23a is not greatly affected by the magnetization generated from the area 24b.

As a note, the recording of information is carried out not on the entire space of the area 23, whereon the light beam 45 is projected, but only on the area 23a located on the side of the rotating direction. As described above, the area 23a is not greatly affected by the demagnetizing field generated by the magnetization of the area 24b. As a result, when the area 24b exhibits upward magnetization, the upward magnetization of the demagnetizing field in the area 23a is made smaller, whereby the overwriting operation through the light intensity modulation can be stably carried out.

Figure 6:
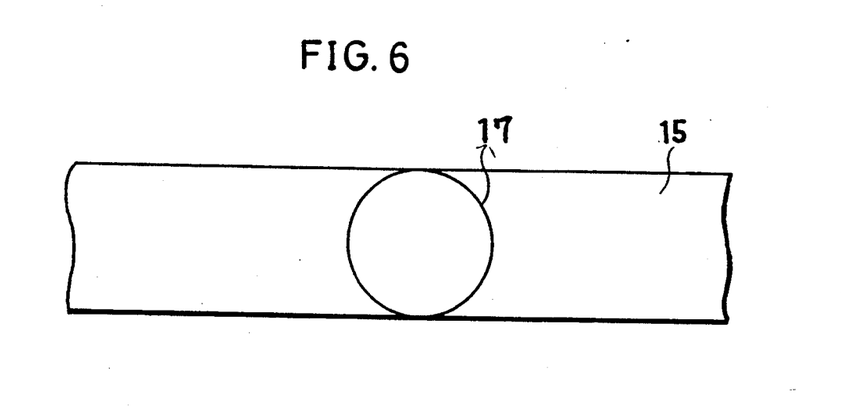
FIG. 6 is an explanatory view showing how the light spot with a circular cross-section of the light beam relates to the recording track.
Figure 7:
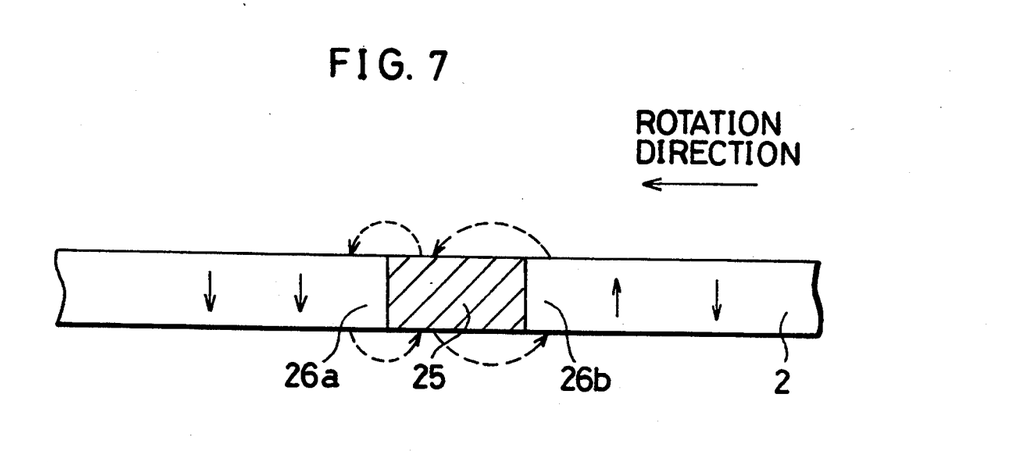
FIG. 7 is an explanatory view showing the demagnetizing field to be applied to the area irradiated with the light beam of FIG. 6.

As can be seen from the comparison examples of FIGS. 6 and 7, when the light spot 17 formed on the recording track 15 has a circular shape, not only the demagnetizing field opposite to the external magnetic field Hex generated by the magnetization of the area 26a adjacent to the side of the rotation direction but also the demagnetizing field generated by the magnetization of the area 26b adjacent to the side opposite to the rotation direction is applied to the area 25 (indicated by a shaded area) of the magnetic thin film with perpendicular magnetization in the magneto-optical recording medium layer 2 whereon the light beam 45 is projected. Thus, the upward magnetization of the demagnetizing field may become smaller in the area 25. This creates the problem that the reliable overwriting operation may not be performed. Therefore, the previously described light spot 16 of an elliptical shape is preferable to the light spot 17 of a circular shape.

As described, with the light beam 45 whose cross section is elliptical, a stable overwriting operation can be carried out through the light intensity modulation by making the major axis of the ellipse substantially parallel to the recording track 15.

For the magnetic thin film with perpendicular magnetization, of the magneto-optical recording medium layer 2, a film of a single layer is used instead of the exchange coupled film. This permits a wider available range for the coercive force and the Curie temperature. The manufacturing process for the magneto-optical disk can therefore be simplified.

Furthermore, since the electro-magnet 46 is provided only for applying a constant external magnetic field Hex, it is not necessary to place it close to the magneto-optical disk. This permits no-contact recording and reproducing operations on and from the magneto-optical disk.

The light beam 45 having a cross section of an elliptical shape is produced when the light emitted from a semiconducting laser is directly used. The shape of the beam can be shaped using the prism as well. The light beam 45 of an elliptical shape may be obtained spuriously by driving the A/O modulator (Acoustic/Optic) at different frequencies as described in the summary of the Autumn Meeting by the Applied Physics Society, page 55, in 1984 (lecture No. 13p-E-4).

The ratio between the major axis and the minor axis may be set at any ratio above 1. However, the greater the ratio, the less the effect on the area 23a (FIG. 5) from the demagnetizing field generated by the magnetization of the area 24b.

In the above embodiment, the time interval in which the intensity of the light beam 45 is at the recording power level $P_L$ preferably corresponds to the interval in which the recording bit with a length of 0.1-1.0 μm is obtained.

As described, according to the magneto-optical recording method of the present embodiment, an overwriting operation can be carried out through the light intensity modulation without requiring an initialization magnet.

Furthermore, with the above magneto-optical disk, if the exchange coupled magnetic film of a double layer structure is used for the magneto-optical recording medium layer 2, the external magnetic field Hex is not required.

The magneto-optical recording medium layer 2 may be produced, for example, by laminating the first dielectric film, the exchange coupled magnetic film consisting of the magnetic thin film with perpendicular magnetization and a bias magnetic film, and the second dielectric film in this order on the base 1. The magnetization of the bias magnetic film is arranged in a direction perpendicular to the magnetic thin film with perpendicular magnetization. Further, the magnetization does not disappear even when the temperature of the magnetic thin film with perpendicular magnetization is raised above its Curie temperature. Thus, the magnetization of the bias magnetic film has substantially the same function with respect to the magnetic thin film with perpendicular magnetization as the electro-magnet 46 in the previous embodiment. This means that the external magnetic field Hex is not required, and the electro-magnet 46 can therefore be omitted from the magneto-optical disk device.

The magneto-optical disk provided with the magneto-optical recording medium layer 2 including the exchange coupled film is produced, for example, as follows. An AlN film with a thickness of 80 nm (first dielectric film), a $Dy_{24}Fe_{71}Co_5$ film with a thickness of 50 nm (magnetic thin film with perpendicular magnetization), a $Gd_{12}Tb_{12}Co_{76}$ film with a thickness of 100 nm (bias magnetic film), and an AlN film with a thickness of 80 nm (second dielectric film) are laminated in this order on the base 1 made of polycarbonate. The magnetic thin film with perpendicular magnetization has coercive force of more than 15 kOe at room temperature, and its Curie temperature is 190° C. The bias magnetic film has coercive force of 1.7 kOe at room temperature, and its Curie temperature is 300° C.

Using the magneto-optical disk described in the above embodiment, an actual test for the overwriting operation is conducted, and the recording bit of the same length as in the previous embodiment was obtained. Here, the test condition is the same as the previous test. As previously described, the external magnetic field Hex needs not be applied from the electro-magnet 46.

Figure 8:
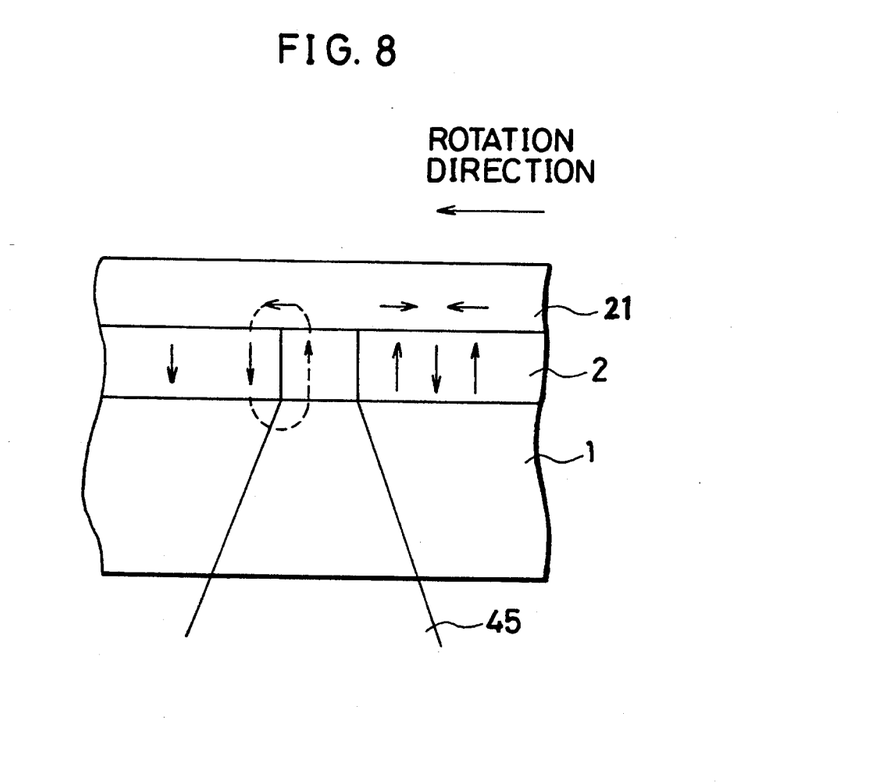
FIG. 8 is a schematic view showing the configuration of the magneto-optical disk device.
Figure 9:
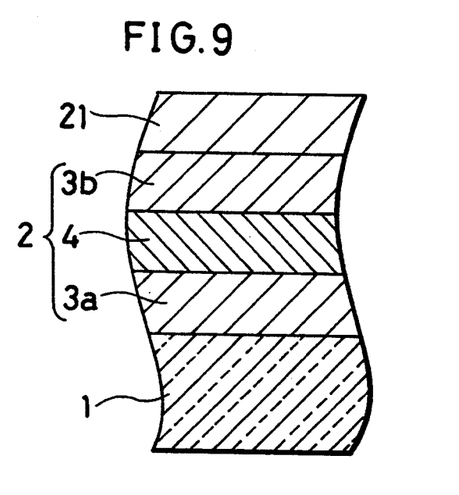
FIG. 9 is a cross sectional view showing a schematic configuration of a magneto-optical recording medium layer of the magneto-optical disk of FIG. 8.
Figure 10:
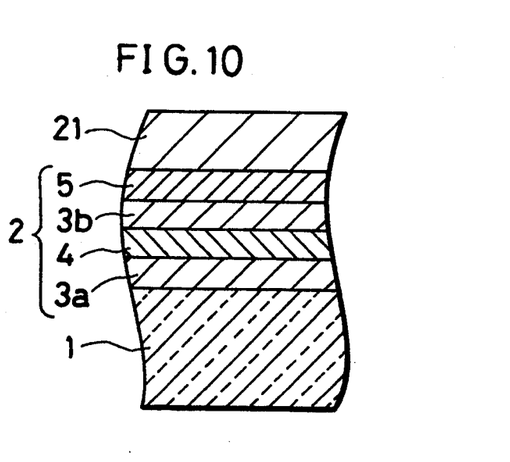
FIG. 10 is a cross sectional view showing a schematic configuration of another magneto-optical recording medium layer of the magneto-optical disk of FIG. 8.

The following description will discuss the second embodiment of the present invention with reference to FIGS. 8 to 10. For the sake of convenience, members having the same function as in the aforementioned embodiment will be designated by the same code and their description will be omitted.

The magneto-optical disk of the present embodiment differs from that of the previous embodiment in that an in-plane magnetization film 21 is formed on the magneto-optical recording medium layer 2 as shown in FIG. 8.

The magneto-optical recording medium layer 2 may have a three layer structure consisting of the first dielectric film 3a, a magnetic thin film with perpendicular magnetization 4 made of a magnetic substance, and the second dielectric film 3b being laminated in this order on the base 1 as shown in FIG. 9. The first and the second dielectric films 3a and 3b are provided for protecting the magnetic thin film with perpendicular magnetization 4. Further, the first dielectric film 3a emphasizes the magnetic Kerr effect. In addition, the magneto-optical recording medium layer 2 may have a four layer structure in which a reflective film 5 is provided on the second dielectric film 3b as shown in FIG. 10.

For the magnetic thin film with perpendicular magnetization 4, for example, a RE-TM (rare-earth transition metal alloys) with Hc (coercive force) of substantially 2 kOe is used. Whereas, SiFeAl, CoTi, etc., is used for the in-plane magnetization film 21. In addition, the thickness of the in-plane magnetization film 21 needs not be set above 200 nm. For the base 1, glass or plastic such as polycarbonate may be used.

For example, the magneto-optical disk having the magneto-optical recording medium layer 2 of a three layer structure is produced as follows. An AlN film with a thickness of 80 nm (first dielectric film 3a), a $Dy_{20}Fe_{56}Co_{24}$ film with a thickness of 100 nm (magnetic thin film with perpendicular magnetization 4), and an AlN film with a thickness of 80 nm (second dielectric film 3b) are laminated in this order on the base 1 made of polycarbonate. The magnetic thin film with perpendicular magnetization has coercive force of 5 kOe at room temperature, and its Curie temperature is 200° C.

Similarly, the magneto-optical disk having the magneto-optical recording layer 2 of a four layer structure may be produced as follows.

An AlN film with a thickness of 80 nm (first dielectric film 3a), a $Dy_{20}Fe_{56}Co_{24}$ film with a thickness of 20 nm (magnetic thin film with perpendicular magnetization 4), an AlN film with a thickness of 25 nm (second dielectric film 3b), and an Al film with a thickness of 50 nm (reflecting film 5) are laminated in this order on the base 1 made of polycarbonate.

The magneto-optical disk of the present embodiment is arranged such that the in-plane magnetization film 21 is formed on the magneto-optical recording medium layer 2. With this arrangement, when carrying out the overwriting operation through the light intensity modulation, the demagnetizing field, generated from the downward magnetization of the area adjacent to the area irradiated with the light beam 45, returns through the in-plane magnetization film 21. Thus, the demagnetizing field in the space is reduced. This means that the intensity of the demagnetizing field, which passes through the area irradiated with the light beam 45, increases. As a result, the demagnetizing field can be effectively used, thereby carrying out an accurate overwriting operation through the light intensity modulation.

For the magnetic thin film with perpendicular magnetization 4, of the magneto-optical recording medium layer 2, a film of a single layer is used instead of the exchange coupled film. This allows a wider available range for the coercive force and the Curie temperature. The manufacturing process for the magneto-optical disk can therefore be simplified.

Furthermore, since the electro-magnet 46 is provided only for applying a constant external magnetic field Hex, it is not necessary to place close to the magneto-optical disk. This allows no-contact recording and reproducing operations on and form the magneto-optical disk.

Figure 11:
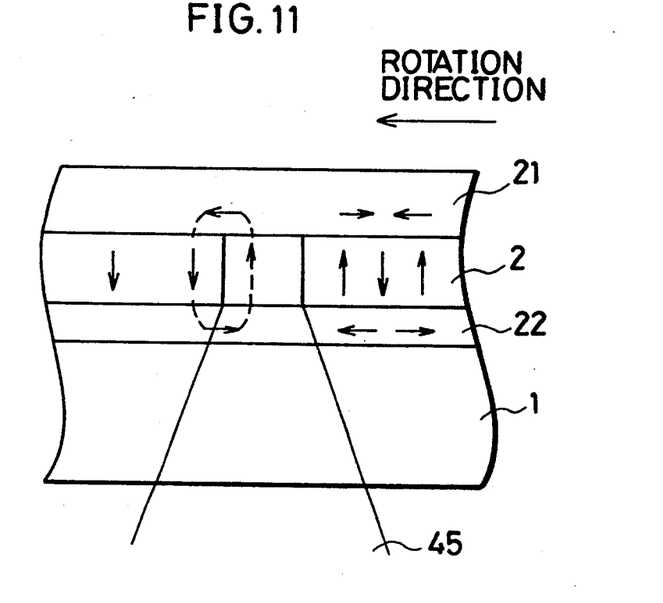
FIG. 11 is a schematic view showing the configuration of the magneto-optical disk.
Figure 12:
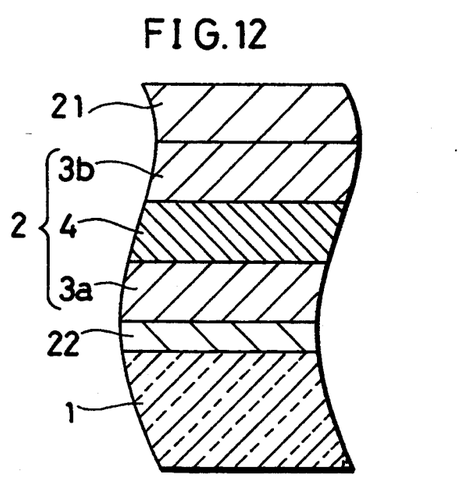
FIG. 12 is a cross sectional view showing a schematic configuration of the magneto-optical recording medium layer of the magneto-optical disk of FIG. 11.
Figure 13:
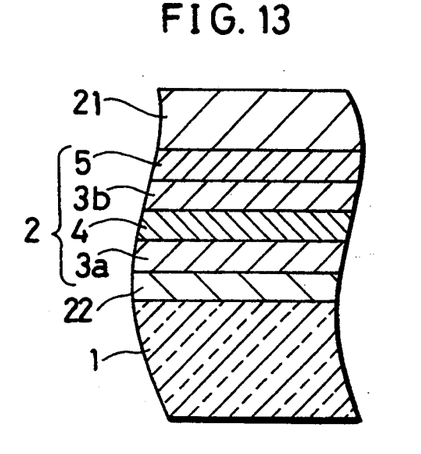

The following description will discuss the third embodiment of the present invention with reference to FIGS. 11 to 13. For the sake of convenience, members having the same function as in the aforementioned embodiment will be designated by the same code and their description will be omitted.

As shown in FIG. 11, the magneto-optical disk of the present embodiment differs from that of the previous embodiment in that an in-plane magnetization film 22 is formed also on the side of the base 1 of the magneto-optical recording medium layer 2. For the in-plane magnetization film 22, a material having a magnetic easy axis in an in-plane direction is used as in the case of the in-plane magnetization film 21. In addition, the thickness of the in-plane magnetization film 21 is set below 20 nm so that the light beam 45 can be transmitted.

The magneto-optical recording medium layer 2, for example, has a three layer structure as shown in FIG. 12. It may have a four layer structure including a reflective film 5 as shown in FIG. 13.

The in-plane magnetization films 21 and 22 are formed respectively on the upper and the lower faces of the magneto-optical recording medium layer 2. With this arrangement, when the overwriting operation is carried out by the described magneto-optical recording method, the demagnetizing field, generated by the downward magnetization of the area adjacent to the area irradiated with the light beam 45, returns through the in-plane magnetization films 31 and 32. As a result, almost no demagnetizing field is left in the space. This means that the intensity of the demagnetizing field, which passes through the area irradiated with the light beam 45, increases. As a result, the demagnetizing field can be more effectively used, thereby carrying out an accurate overwriting operation through the light intensity modulation.

Figure 14:
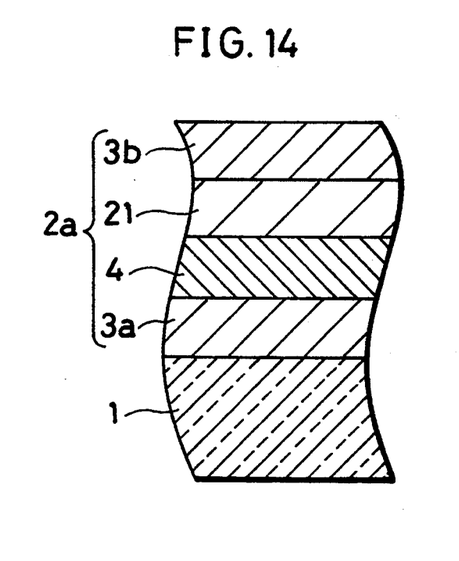
FIG. 14 is a cross sectional view showing a schematic configuration of a magneto-optical disk provided with an in-plane magnetization film in the magneto-optical recording medium layer.
Figure 15:
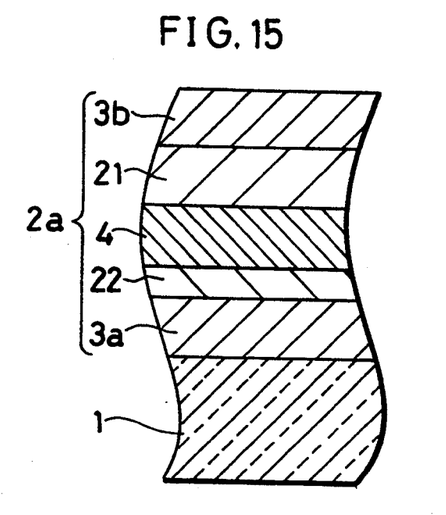
FIG. 15 is a cross sectional view showing a schematic configuration of another magneto-optical disk provided with an in-plane magnetization film in the magneto-optical recording medium layer.

The following description will discuss the fourth embodiment of the present invention with reference to FIGS. 14 and 15. For the sake of convenience, members having the same function as in the aforementioned embodiment will be designated by the same code and their description will be omitted.

The magneto-optical disk of the present embodiment differs from the magneto-optical disk of the previous embodiment in that the in-plane magnetization film 31 or 32 is provided so as to be in contact with the magnetic thin film with perpendicular magnetization 4. Thus, the in-plane magnetization film 21 or 22 is included in the magneto-optical recording medium layer 2a.

As shown in FIG. 14, the magneto-optical recording medium layer 2a has the first dielectric film 3a, the magnetic thin film with perpendicular magnetization 4 made of a magnetic substance, the in-plane magnetization film 21, and the second dielectric film 3b which are laminated in this order on the base 1.

As shown in FIG. 15, not only the in-plane magnetization film 21, the in-plane magnetization film 22, through which the light beam 45 can be transmitted, may also be provided between the first dielectric film 3a and the magnetic thin film with perpendicular magnetization 4.

According to the above arrangement, the in-plane magnetization film 21 or 22 is in contact with the magnetic thin film with perpendicular magnetization 4. Therefore, when the overwriting operation is carried out by the magneto-optical recording method, the demagnetizing field in the space is still reduced, thereby permitting a more efficient use of the demagnetizing field.

Figure 16:
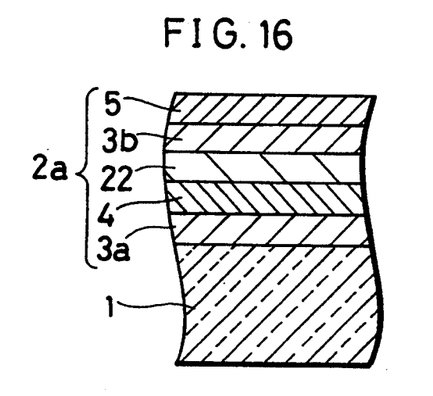
FIG. 16 is a cross sectional view showing a schematic configuration of a reflective-type magneto-optical disk provided with an in-plane magnetization film in the magneto-optical recording medium layer.
Figure 17:
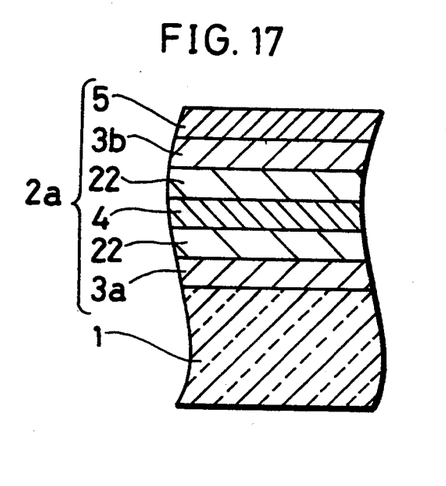
FIG. 17 is a cross sectional view showing a schematic configuration of another reflective-type magneto-optical disk provided with an in-plane magnetization film in the magneto-optical recording medium layer.

The following description will discuss the fifth embodiment of the present invention with reference to FIGS. 16 and 17. For the sake of convenience, members having the same function as in the aforementioned embodiment will be designated by the same code and their description will be omitted.

The magneto-optical disk of the present embodiment differs from that of the previous embodiment in that the magneto-optical recording medium layer 2a includes the in-plane magnetization film 22, through which the light beam 45 can be transmitted, and that the reflective film 5 is formed, in order to obtain the magneto-optical disk of the reflective-type.

As shown in FIG. 16, the magneto-optical recording medium layer 2a is, for example, arranged such that the first dielectric film 3a, the magnetic thin film with perpendicular magnetization 4 made of a magnetic substance, the in-plane magnetization film 22, the second dielectric film 3b and the reflective film 5 are laminated on the side of the base 1.

It may also be arranged such that the in-plane magnetization film 22 is further formed between the first dielectric film 3a and the magnetic thin film with perpendicular magnetization 4 as shown in FIG. 17.

According to the above arrangement, since the in-plane magnetization film 22, through which the light beam 45 can be transmitted, is in contact with the magnetic thin film with perpendicular magnetization 4, thereby providing a reflective-type magneto-optical disk this provides the demagnetizing field to be more efficiently used.

Although in the above embodiments, the magneto-optical disk is used as an example of the magneto-optical memory devices, other types of memory devices may be applicable to the present invention as well, such as a magneto-optical card, a magneto-optical tape, etc. When the magneto-optical tape is used, a flexible base such as a polyethylene terephthalate tape, etc., may be used instead of the base 1.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording method comprising the steps of:

driving a magneto-optical memory device in a recording track direction, the memory device being provided with a base substrate having a magnetic thin film with perpendicular magnetization formed thereon on which information is to be recorded;

applying an external magnetic field of a constant intensity in a direction perpendicular to a surface of the magnetic thin film with perpendicular magnetization;

forming an erased area having a magnetization arranged in a direction of the external magnetic field by projecting a light beam of a high intensity to the magnetic thin film with perpendicular magnetization, the high intensity being defined as an intensity for raising the temperature of the magnetic thin film with perpendicular magnetization above its Curie temperature; and forming a recording area having a magnetization arranged in an opposite direction to the direction of the external magnetic field using a demagnetizing field generated only from the erased area formed directly before forming the recording area by projecting a light beam of a low intensity to an area whereon a light beam is to be projected next to the erased area as the recording track moves, the low intensity being defined as an intensity for lowering the temperature of the magnetic thin film with perpendicular magnetization from above its Curie temperature to below its Curie temperature.

2. A magneto-optical recording method comprising the steps of:

driving a magneto-optical memory device in a recording track direction, the memory device being provided with a base substrate having a magnetic thin film with perpendicular magnetization on which information is to be recorded and a bias magnetic film which are formed thereon, the magnetization direction of the bias magnetic film being arranged in a direction perpendicular to a surface of the magnetic thin film with perpendicular magnetization;

forming an erased area having a magnetization arranged in a first direction to be determined by a magnetization direction of the bias magnetic film by projecting a light beam of a high intensity to the magnetic thin film with perpendicular magnetization, the high intensity being defined as an intensity for raising the temperature of the magnetic thin film with perpendicular magnetization above its Curie temperature; and forming a recording area having a magnetization arranged in an opposite direction to the first direction using a demagnetizing field generated only from the erased area formed directly before forming the recording area by projecting a light beam of a low intensity to an area whereon a light beam is to be projected next to the erased area as the recording track moves, the low intensity being defined as an intensity for lowering the temperature of the magnetic thin film with perpendicular magnetization from above its Curie temperature to below its Curie temperature.

3. A magneto-optical recording method as set forth in claims 1 or 2 wherein the low intensity light beam has an intensity which is nearly zero.

4. The magneto-optical recording method as set forth in claim 1 or 2, wherein:
a light spot formed on the magnetic thin film with perpendicular magnetization by projecting the light beam has an elliptical shape whose major axis is set parallel to the recording track.

5. A magneto-optical recording method as set forth in claim, 4 wherein the low intensity light beam has an intensity which is nearly zero.

* * * * *